United States Patent [19]
Otake

[11] Patent Number: 6,009,001
[45] Date of Patent: Dec. 28, 1999

[54] SELF-OSCILLATION-RESONANCE TYPE POWER SUPPLY CIRCUIT

[75] Inventor: Tetushi Otake, Tokyo, Japan

[73] Assignee: Toko, Inc., Tokyo, Japan

[21] Appl. No.: 09/273,866

[22] Filed: Mar. 22, 1999

[30]    Foreign Application Priority Data

Mar. 27, 1998 [JP] Japan .................................. 10-098098
Mar. 27, 1998 [JP] Japan .................................. 10-098099

[51] Int. Cl.⁶ .................................................. H02M 3/335
[52] U.S. Cl. ............................................................ 363/23
[58] Field of Search ........................................ 363/23, 25

[56]          References Cited

U.S. PATENT DOCUMENTS 4,755,923  7/1988  Maeba et al. .............................. 363/56

FOREIGN PATENT DOCUMENTS 32-4066   4/1954  Japan .
60-070973 4/1985  Japan .
8-223939  8/1996  Japan .
9-245983  9/1997  Japan .

*Primary Examiner*—Shawn Riley
*Attorney, Agent, or Firm*—Frishauf, Holtz, Goodman, Langer & Chick, P.C.

[57]          ABSTRACT

A self-oscillation-resonance type power supply circuit having a stabilizer for output voltages or output currents. A transformer and two transistors (a first transistor and a second transistor) are used to form a push-pull type self-oscillation-resonance type power supply circuit. Feedback signals that change according to resonant voltages are inputted to individual gates of the first transistor and the second transistor, a controller for generating error signals corresponding to the difference between a voltage signal and a reference signal is included in the circuit, and the error signals are fed to the individual gates of the first transistor and the second transistor, whereby conduction timing of the individual transistors is changed to vary the self-oscillation frequency. When the self-oscillation frequency changes,, the amount of energy to be transferred form a resonant circuit formed by a resonance capacitor circuit and a first finding of the transformer to a second winding of the transformer so as to control output voltages.

7 Claims, 2 Drawing Sheets

SELF-OSCILLATION-RESONANCE TYPE POWER SUPPLY CIRCUIT

BACKGROUND OF THE INVENTION

1. Field of the Invention

The present invention relates to a technique for stabilizing voltages and currents to be outputted from a power supply circuit of a self-oscillation and resonance type (hereinafter, referred to as a self-oscillation-resonance type power supply circuit) obtained by improving the Royer oscillation circuit.

2. Description of the Related Art

Power-supply circuits for supplying driving voltages to a load include those adopting various types of circuits and driving methods. As power-supply circuits used to respond to a load requiring an alternating-current (AC) driving voltage, self-oscillation-resonance type power supply circuits are known. It has been obtained by improvement of the Royer oscillation circuit. The self-oscillation-resonance type power supply circuit has a push-pull configuration including a self-oscillation driving method to output voltages involving a resonant phenomenon.

The self-oscillation-resonance type power supply circuit as described above has advantages in that its configuration is simpler and it easily outputs substantially a sine-wave AC voltage. Because of these advantages, the circuit (which is now reduced in size) is being widely used as a small-capacitance inverter circuit. Furthermore, because of the advantageous feature that the circuit outputs substantially a sine-wave voltage, the circuit is also us ed as a DC-to-DC converter circuit for an apparatus which request to generate seldom noise.

In the past, there was substantially no case in which self-oscillation-resonance type power supply circuits had thereto controllers that regulate output voltages so as to be constant. This is because since the self-oscillation-resonance type power supply circuit performs self-oscillation operations in coincidence with the occurrence of the resonant phenomenon, application of a control means, such as a PWM (pulse-width modulation) controller, thereto was considered to be difficult. Therefore, as shown in FIG. 1, a power-supply unit has been constructed with an inverter formed of a self-oscillation-resonance type power supply circuit and a converter that possesses an output-voltage controller, in which voltages to be fed to a load are stabilized by control of voltages to be fed from the converter to the inverter.

Such a circuit including both the inverter and the converter, however, requires more components and a larger substrate space for configuration of the converter than in the case of an inverter-based circuit. This produces problems in that the total scale of the power-supply unit is increased, and in addition, production cost is increased.

SUMMARY OF THE INVENTION

Accordingly, it is an object of the present invention to provide a self-oscillation-resonance type power supply circuit that can be used for construction of a smaller and less expensive power-supply unit.

To these ends, according to an aspect of the present invention, there is provided a self-oscillation-resonance type power supply circuit that includes a transformer possessing a predetermined inductance in a first winding of a transformer; a resonance capacitor circuit connected parallel to the first winding of the transformer and forming a resonant circuit in cooperation with the first winding of the transformer; a first transistor and a second transistor in which one end each of main current paths thereof is connected to a predetermined ends of the first winding of the transformer, and feedback signals obtained from voltages occurring in a winding of the transformer are fed to individual control terminals thereof in a reversed phase; a choke coil together with an external input voltage source connected between a tap arranged in a predetermined position of the first winding of the transformer and a common connection point of other ends of the main current paths of the first transistor and the second transistor; and a controller receiving a voltage signal corresponding to an electrical output (a current or a voltage) of a second wiring of the transformer, for generating an error signal corresponding to the difference between the voltage signal and a reference signal; wherein the error signal together with the feedback signal is inputted to the control terminals of the first transistor and the second transistor.

In the above case, the voltage signal may be obtained from a voltage occurring in a predetermined winding of the transformer.

Furthermore, the controller may include a series circuit of a diode and a capacitor, which is connected between terminals of a predetermined winding of the transformer; a series circuit of a first resistor and a constant voltage element, which is connected between an input terminal and a reference potential point; a control transistor of which an emitter is connected to one end of the capacitor; a second resistor connected between a connection point of the first resistor and the constant voltage element and a collector of the control transistor; and a third resistor connected between the connection point of the first resistor and the constant voltage element and a base of the control transistor; the error signal being obtained from the collector of the control transistor.

Furthermore, the self-oscillation-resonance type power supply may include a current detector for detecting a current flowing in the second winding of the transformer, the voltage signal being obtained from the current detector.

Furthermore, the controller may alternatively include a series circuit of a first resistor and a first constant voltage element, which is connected between an input terminal and a reference potential point; a voltage-dividing circuit of which one end is connected to a connection point between the first resistor and the first constant voltage element; a series circuit of a diode and a capacitor, which is connected between terminals of a predetermined winding of the transformer; a second constant voltage element connected parallel to the capacitor; and an error amplifier in which a voltage between terminals of the first constant voltage element is used as a first driving voltage, a voltage between terminals of the second constant voltage element is used as a second driving voltage, a voltage signal is inputted from the current detector to one input terminal, and a reference voltage is inputted to another input terminal through the voltage-dividing circuit.

Furthermore, the resonance capacitor circuit may be formed of a plurality of capacitors serially connected; the control terminal of the first transistor may be connected to a first connection point of predetermined capacitors in the resonance capacitor circuit, with at least one capacitor element left apart from one end of the first winding of the transformer; and the control terminal of the second transistor may be connected to a second connection point of predetermined capacitors in the resonance capacitor circuit, with at least one capacitor element left apart from another end of the first winding of the transformer.

Furthermore, the resonance capacitor circuit may be formed of four capacitors; a connection point of the capacitors, which is positioned in the center of the resonance capacitor circuit, may be grounded; and the first transistor and the second transistor may be individually made of a field-effect transistor (FET).

DESCRIPTION OF THE PREFERRED EMBODIMENTS

Figure 1:
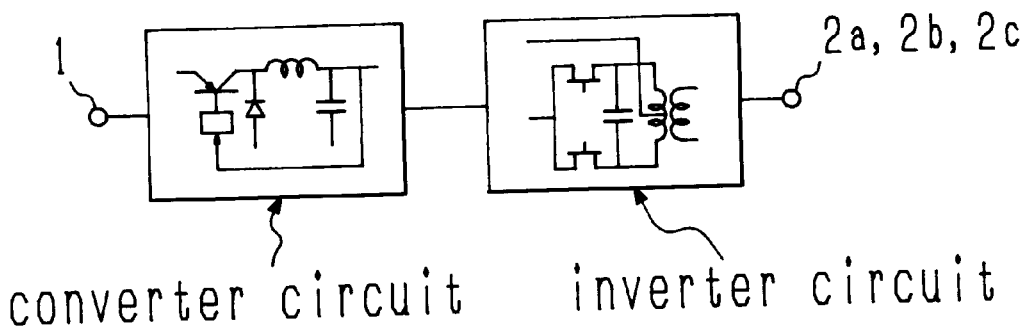
FIG. 1 is a drawing showing a conventional power supply which combines a converter with a self-oscillation-resonance type power supply circuit to stabilize output voltages.
Figure 2:
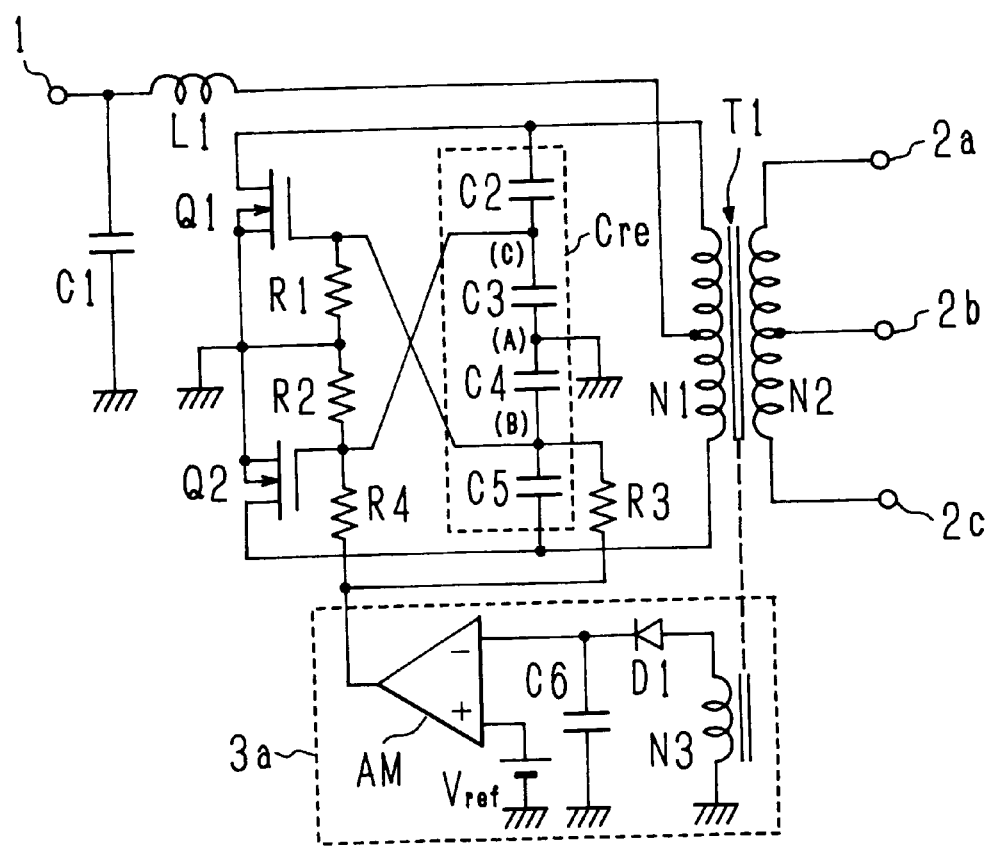
FIG. 2 is a circuit diagram of a first embodiment of a self-oscillation-resonance type power supply circuit according to the present invention.

FIG. 2 shows a circuit of a first embodiment of a self-oscillation-resonance type power supply circuit according to the present invention. The circuit in this figure is configured as will be described below. First in FIG. 2, 1 denotes a direct current (DC) input terminal on the high potential side. A DC input terminal on the low potential side is omitted in this figure; however, the description here assumes that it is connected to a reference potential point, that is, a grounding point.

The input terminal 1 is connected to an intermediate tap of a first winding N1 of a transformer T1 through a choke coil L1, and a resonance capacitor circuit Cre is connected between terminals of the first winding N1. The resonance capacitor circuit Cre is formed of a series circuit constituted of capacitors C2, C3, C4, and C5.

To the respective ends of the first winding N1 there are connected drains of a first transistor Q1 and a second transistor Q2 that are individually made of field-effect transistors (FETs). Sources of both the first transistor Q1 and the second transistor Q2 are grounded.

A connection point (A) of the capacitors C3 and C4 is grounded so that the resonance capacitor circuit Cre is separated into two series circuits: one is formed of the capacitor C2 and the capacitor C3, and another is formed of the capacitor C4 and the capacitor C5. A connection point (C) of the capacitors C2 and C3 is connected to a gate of the second transistor Q2. A connection point (B) of the capacitors C4 and C5 is connected to a gate of the first transistor Q1. Between the respective gates and sources of the first transistor Q1 and the second transistor Q2, a resistor R1 and a resistor R2 are connected.

To the individual gates of the first transistor Q1 and the second transistor Q2, a controller 3a is connected through a resistor R3 and a resistor R4. The controller 3a is configured as described below.

One end of a detection winding N3 of the transformer T1 is grounded, and a series circuit of a diode D1 and a capacitor C6 is connected between terminals of the detection winding N3. Then, an error amplifier AM is arranged; and an inversion input terminal (−) thereof is connected to one end of the capacitor C6, and a non-inversion input terminal (+) thereof is connected to a reference voltage $V_{ref}$. An output terminal of the error amplifier AM is connected to one end each of the resistors R3 and R4.

For reference, two ends and an intermediate tap of a second winding N2 of the transformer T1 are connected to output terminals 2a, 2c, and 2b, respectively, and a capacitor C1 is connected between the input terminal 1 and a ground.

In a circuit such as that described above, application of a voltage to the input terminal 1 from an external source allows either one of the first transistor Q1 and the second transistor Q2 to be conductive. The description here assumes that the first transistor Q1 is first turned into a conductive state.

According to the first transistor Q1 that is now conductive, current flows in the first winding N1, and voltage is induced in the first winding N1. At this time, the voltage induced in the first winding N1 is divided in the resonance capacitor circuit Cre according to the capacitance of the individual capacitors. Then, a voltage occurring between terminals of the capacitor C4 is applied between the gate and the source of the first transistor Q1 as a feedback signal; a voltage occurring between terminals of the capacitor C3 is applied between the gate and the source of the second transistor Q2 as a feedback signal.

According to the feedback signals applied as above, a forward bias is applied to the first transistor Q1, whereas a reverse bias is applied to the second transistor Q2. Accordingly, the first transistor Q1 is turned on, while the second transistor Q2 is turned off.

When voltage is induced in the first winding N1, a resonant phenomenon is caused in a resonant circuit formed of the first winding N1 and the resonance capacitor circuit Cre. Because of such a resonant phenomenon occurring in the resonant circuit, the voltage (a resonant voltage) that has occurring between the terminals of the first winding N1 is changed to a sine-wave-state voltage. The feedback signals to be fed to the first transistor Q1 and the second transistor Q2 are substantially divided voltages of the resonant voltage. Therefore, in response to this change in the resonant voltage, the first transistor Q1 and the second transistor Q2 turn on or turn off alternately. From this time on, the circuit shown in FIG. 2 continuously performs self-excited-resonance operations.

In the inside of the controller 3a, the diode D1 and the capacitor C6 converts a voltage occurring in the detection winding N3 to a DC voltage signal equivalent to an output voltage. The error amplifier AM receives the DC voltage signal and the reference voltage $V_{ref}$ to generate an error signal corresponding to the difference between the reference voltage $V_{ref}$ and the DC voltage signal. The error signal that was thus produced is then inputted to the individual gates of the first transistor Q1 and the second transistor Q2 through the resistors R3 and R4.

Having been provided with the error signal, the first transistor Q1 and the second transistor Q2 individually change according to the level of the error signal with respect to the bias state. Then, a period and timing of conduction of the first transistor Q1 and the second transistor Q2 are allowed to change depending on the error signal.

At this time, according to the change in the conduction period and timing of the individual transistors, there occurs a change in the oscillation frequency due to the self-excited operation. For reference, in testing with an experimental apparatus, the oscillation frequency changed according to variation of input voltages. From such a test result, the oscillation frequency was considered to change depending upon the error signal. As the oscillation frequency changes, there occurs a change in the amount of energy to be transferred to the second winding N2 through the resonant circuit, which is formed with the first winding N1 and the resonance capacitor circuit Cre, causing the output-voltage level to change. By this, control of the output voltage can be implemented so as to stabilize output voltages with the error signal fed to the individual transistors.

Accordingly, for producing stabilized output voltages, a converter circuit having an output control function is no longer required to be included in the input side of the power supply unit. In this case, a smaller and less expensive power supply unit can be constructed.

Figure 3:
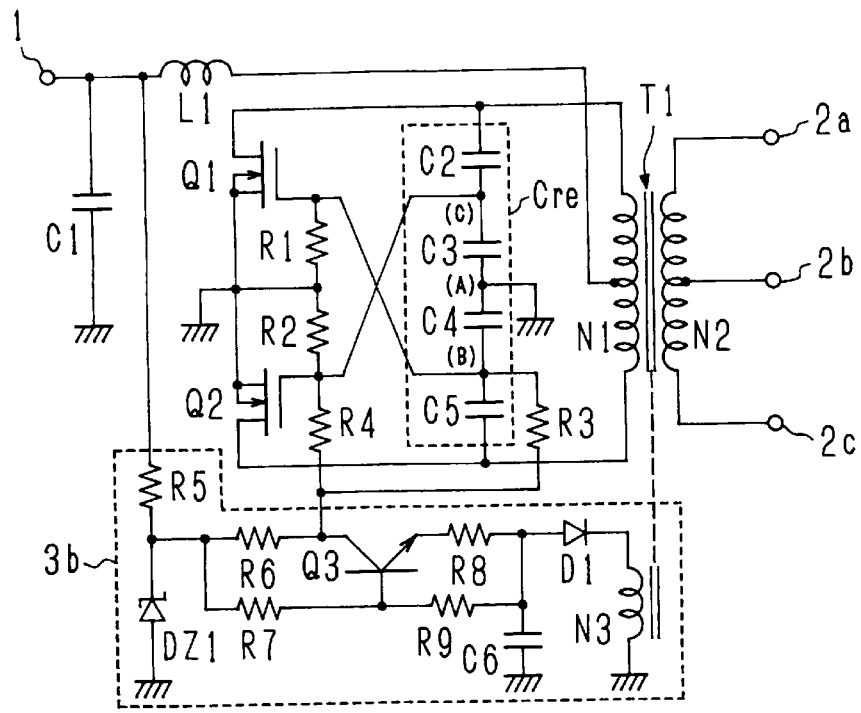
FIG. 3 is a circuit diagram of a second embodiment of a self-oscillation-resonance type power supply circuit according to the present invention.

FIG. 3 shows a self-oscillation-resonance type power supply circuit of a second embodiment according to the present invention. In this figure, the controller 3a in FIG. 2 is shown in more detail as a controller 3b that is configured as described below. Portions of the circuit configuration except for the controller 3b are substantially the same as those in FIG. 2.

One end of a detection winding N3 is grounded, and between terminals thereof is connected a series circuit of a diode D1 and a capacitor C6. In this case, a connection configuration is constructed such that a negative voltage corresponding to the ground can be fed to one end of the capacitor C6. Between an input terminal 1 and a grounding point, a series circuit of a resistor R5 and a constant voltage diode DZ1 is connected in a manner such that an anode of the constant voltage diode DZ1 is grounded.

A control transistor Q3 is arranged, a collector of the control transistor Q3 is connected to a cathode of the constant voltage diode DZ1 through a resistor R6, and furthermore, a base is connected to the cathode of the constant voltage diode DZ1 through a resistor R7. An emitter of the control transistor Q3 is connected to one end of a capacitor C6 through a resistor R8, and furthermore, a base is connected to the end of the capacitor C6 through a resistor R9. A collector of the control transistor Q3 is connected to one end each of resistors R3 and R4.

In such a configuration, a voltage occurring at the both ends of the constant voltage diode DZ1 is to be a reference voltage $V_{ref}$, and a negative voltage occurring at one end of the capacitor C6 is to be a voltage signal that depends upon an output voltage. Furthermore, a circuit area of the control transistor Q3 and the resistors R6 to R9 in FIG. 3 substantially functions as an error amplifier, resulting in the overall operation of the circuit in FIG. 3 being substantially the same as in the case of the circuit in FIG. 2.

Figure 4:
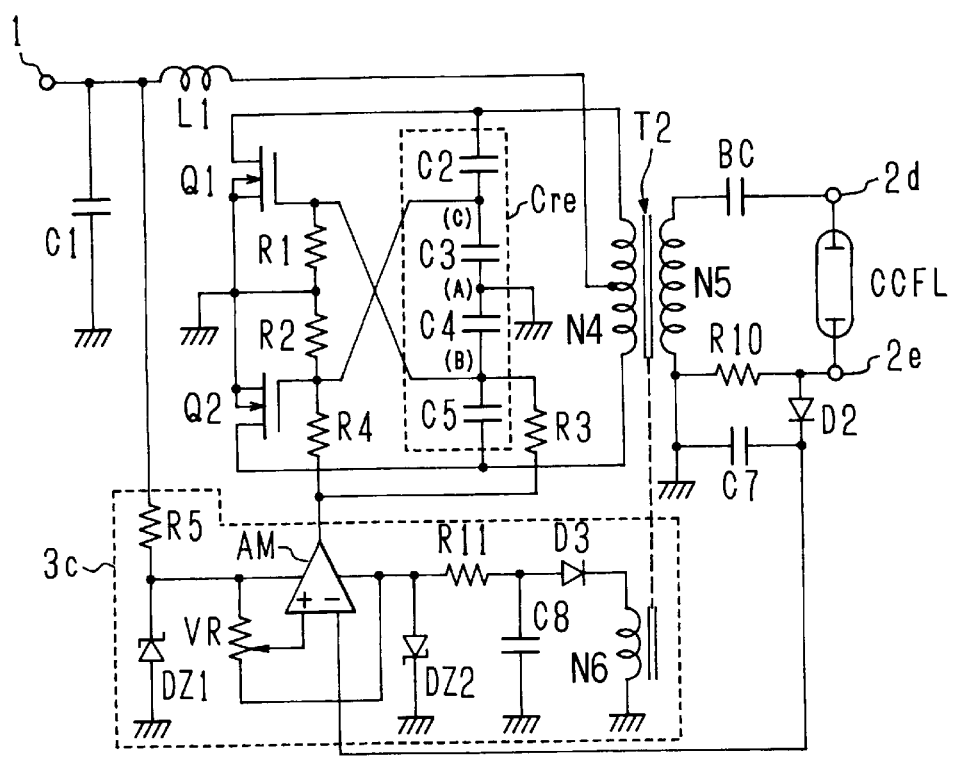
FIG. 4 is a circuit diagram of a third embodiment of a self-oscillation-resonance type power supply circuit of the present invention.

FIG. 4 illustrates a self-oscillation-resonance type power supply circuit of a third embodiment according to the present invention. The circuits shown in FIGS. 2 and 3 are the power supply circuits configured so as to stabilize voltages to be outputted therefrom. However, the circuit in FIG. 4 is configured so as to stabilize current to be outputted therefrom.

The circuit in FIG. 4 is configured as described below.

An input terminal 1 is connected to an intermediate tap of a first winding N4 of a transformer T2 through a choke coil L1, and a resonance capacitor circuit Cre is connected between terminals of the first winding N4. The resonance capacitor circuit Cre is formed of a series circuit of capacitors C2, C3, C4, and C5. Between the input terminal 1 and a ground there is connected a capacitor C1 for filtering.

To the respective ends of the first winding N4, there are connected drains of a first transistor Q1 and a second transistor Q2 that are individually made of field-effect transistors (FETs). Sources of both the first transistor Q1 and the second transistor Q2 are connected to a ground.

A connection point (A) of the capacitors C3 and C4 is grounded so that the resonance capacitor circuit Cre is separated into two series circuits: one is formed of the capacitor C2 and the capacitor C3, and another is formed of the capacitor C4 and the capacitor C5. A connection point (C) of the capacitors C2 and C3 is connected to a gate of the second transistor Q2. A connection point (B) of the capacitors C4 and C5 is connected to a gate of the first transistor Q1. Between the individual gates and sources of the first transistor Q1 and the second transistor Q2, a resistor R1 and a resistor R2 are connected.

A ballast capacitor BC as a current-limiting element is connected to between one end of the second winding N5 of a transformer T2 and an output terminal 2d. As an external load, a cold-cathode florescent lamp CCFL is connected between the output terminal 2d and an output terminal 2e. A resistor R10 is connected between another end of the second winding N5 and the output terminal 2e; a series circuit of a diode D2 and a capacitor C7 is connected between ends of the resistor R10; and a current detector is formed by these resistor R10, diode D2, and the capacitor C7.

To the individual gates of the first transistor Q1 and the second transistor Q2, a controller 3c is connected through a resistor R3 and a resistor R4. This controller 3c is configured as described below.

A series circuit of a resistor R5 and the constant voltage diode DZ1 is connected between the input terminal 1 and a grounding point so that an anode of the constant voltage diode DZ1 is grounded. One end of a third winding N6 of the transformer T2 is grounded, and a series circuit of a diode D3 and a capacitor C8 is connected between terminals of the third winding N6. For reference, a connection configuration is constructed such that a negative voltage corresponding to the ground can be fed to one end of the capacitor C8.

A series circuit of a resistor R11 and a constant voltage diode DZ2 is connected between terminals of the capacitor C8 so that a cathode of the constant voltage diode DZ2 is grounded. Respective main terminals of a variable resistor VR as a voltage-dividing circuit are connected to a cathode of the constant voltage diode DZ1 and an anode of the constant voltage diode DZ2. Then, an error amplifier AM is arranged; and a reference voltage obtained at a movable terminal of the variable resistor VR is inputted to one input terminal (+) thereof, and a voltage signal obtained at one end of the capacitor C7 is inputted to another input terminal (−) thereof. An output terminal of the error amplifier AM is connected to one end each of the resistor R3 and the resistor R4. As driving voltages, respective positive voltages occurring at the cathode of the constant voltage diode DZ1 and negative voltages occurring at the anode of the constant voltage diode DZ2 are fed to the two terminals (positive/negative terminals).

A circuit such as that described above provides the same self-excited oscillation operations as in the case in FIG. 2. In this circuit, as shown in FIG. 4, according to the self-excited oscillation operation, operations as will be described below are performed to stabilize current to be outputted therefrom.

With a voltage occurring in the second winding N5 according to the self-excited oscillation operation, an alternating current (AC) is allowed to flow to the ballast capacitor BC, the cold-cathode florescent lamp CCFL, and the resistor R10. At this time, a voltage corresponding to an output current flowing in the second winding N5 occurs between terminals of the resistor R10. When the voltage between the terminals of the resistor R10 is rectified and smoothed, a DC voltage signal can be produced between terminals of the capacitor C7. In the inside of the controller 3c, the voltage signal obtained between the terminals of the capacitor C7 is compared by the error amplifier AM to the reference signal obtained at the movable terminal of the variable resistor VR so that an error signal equivalent to the difference therebetween is generated. The error signal thus generated is inputted to individual gates of the first transistor Q1 and the second transistor Q2 through the resistor R3 and the resistor R4.

Having been provided with the error signal, the first transistor Q1 and the second transistor Q2 individually change according to the level of the error signal with respect to the bias state. Then, a period and timing of conduction of the first transistor Q1 and the second transistor Q2 change depending on the error signal, and accordingly, there occurs a change in the oscillation frequency due to the self-oscillation operation. As the oscillation frequency changes, there occurs a change in the amount of energy to be transferred to the second winding N5 through the resonant circuit, which is formed with the first winding N4 and the resonance capacitor circuit Cre, causing a change in the output-current flowing in the second winding N5. As a result of the above, by supplying the error signal fed to the individual transistors, control of the output current can be implemented so as to stabilize output current.

Such being the case, according to the self-oscillation-resonance power supply in the circuit configuration in FIG. 4, for producing stabilized output current, a converter circuit having an output control function is no longer be required to be included in the input side of the power supply unit. Therefore, a smaller and less expensive power supply unit can be constructed.

For reference, in the circuit in FIG. 4, when the movable terminal of the variable resistor VR is operated to change the level of the reference signal to be inputted to the error amplifier AM, the level of the output current accordingly changes. This allows the cold-cathode florescent lamp to be dimmed.

In these embodiments of the present invention, as illustrated in FIGS. 2 to 4, n-channel field-effect transistors are used; however, the circuit may be configured with different types of transistors. Furthermore, although the resonance capacitor circuit Cre is configured with the four capacitor elements, it may be configured with a larger number of capacitor elements.

The circuit in either FIG. 2 or 3 is configured as an inverter circuit that feeds an AC current occurring in the second winding N2 to a load; however, it may be used as a converter circuit by connecting a rectifying-smoothing circuit to the second winding N2. On the other hand, the circuit in FIG. 4 has the ballast capacitor BC as a current limitation element which is connected between in the second winding N5 and the cold-cathode florescent lamp CCFL; however; it may use a choke coil as a substitute therefor. Furthermore, in place of the resistor R10 as a current detector, a current transformer may be used.

As described above, it will be understood as a matter of course that these embodiments are only illustrative, and various changes and modifications may be included therein without departing from the scope of the invention.

What is claimed is:

1. A self-excited-resonance power supply comprising:
   a transformer possessing a predetermined inductance in a first widing;
   a resonance capacitor circuit connected parallel to the first winding of the transformer and forming a resonant circuit in cooperation with the first winding;
   a first transistor and a second transistor in which one end each of main current paths thereof is connected to ends of the first winding of the transformer, and feedback signals obtained from voltages occurring in a winding of the transformer are fed to individual control terminals thereof in a reversed phase;
   a choke coil together with an external input voltage source connected between a tap arranged in a predetermined position of the first winding of the transformer and a common connection point of other ends of the main current paths of the first transistor and the second transistor; and
   a controller receiving a voltage signal corresponding to an electrical output (a current or a voltage) of a second wiring of the transformer, for generating an error signal corresponding to the difference between the voltage signal and a reference signal;
   wherein the error signal together with the feedback signal is inputted to the control terminals of the first transistor and the second transistor.

2. A self-excited-resonance power supply according to claim 1, wherein the voltage signal is obtained from a voltage occurring in a predetermined winding of the transformer.

3. A self-excited-resonance power supply according to claim 2, wherein the controller comprises:
   a series circuit of a diode and a capacitor, which is connected between terminals of a predetermined winding of the transformer;
   a series circuit of a first resistor and a constant voltage element, which is connected between an input terminal and a reference potential point;
   a control transistor of which an emitter is connected to one end of the capacitor;
   a second resistor connected between a connection point of the first resistor and the constant voltage element and a collector of the control transistor; and
   a third resistor connected between the connection point of the first resistor and the constant voltage element and a base of the control transistor;
   wherein the error signal is obtained from the collector of the control transistor.

4. A self-excited-resonance power supply according to claim 1, comprising a current detector for detecting a current flowing in the second winding of the transformer, the voltage signal being obtained from the current detector.

5. A self-excited-resonance power supply for a discharge lamp according to claim 4, wherein the controller comprises:
   a series circuit of a first resistor and a first constant voltage element, which is connected between an input terminal and a reference potential point;
   a voltage-dividing circuit of which one end is connected to a connection point between the first resistor and the first constant voltage element;
   a series circuit of a diode and a capacitor, which is connected between terminals of a predetermined winding of the transformer;
   a second constant voltage element connected parallel to the capacitor; and
   an error amplifier in which a voltage between terminals of the first constant voltage element is used as a first input voltage, a voltage between terminals of the second constant voltage element is used as a second driving voltage, a voltage signal is inputted from the current detector to one input terminal, and a reference voltage is inputted to another input terminal through the voltage-dividing circuit.

6. A self-oscillation-resonance power supply according to claim 1, wherein:

the resonance capacitor circuit is formed of a plurality of capacitors serially connected;

the control terminal of the first transistor is connected to a first connection point of predetermined capacitors in the resonance capacitor circuit, with at least one capacitor element left apart from one end of the first winding of the transformer; and the control terminal of the second transistor is connected to a second connection point of predetermined capacitors in the resonance capacitor circuit, with at least one capacitor element left apart from another end of the first winding of the transformer.

7. A self-oscillation-resonance power supply according to claim 6, wherein:

the resonance capacitor circuit is formed of four capacitors;

a connection point of the capacitors, which is positioned in the center of the resonance capacitor circuit, is grounded; and the first transistor and the second transistor are individually made of a field-effect transistor (FET).

* * * * *